(12) United States Patent
Uekuri

(10) Patent No.: US 10,073,800 B2
(45) Date of Patent: Sep. 11, 2018

(54) COUPLING CONTROLLER, INFORMATION PROCESSING APPARATUS AND COUPLING CONTROL METHOD

(71) Applicant: FUJITSU LIMITED, Kawasaki-shi, Kanagawa (JP)

(72) Inventor: Hiromiki Uekuri, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 334 days.

(21) Appl. No.: 14/825,478

(22) Filed: Aug. 13, 2015

(65) Prior Publication Data
US 2015/0347336 A1    Dec. 3, 2015

Related U.S. Application Data

(63) Continuation of application No. PCT/JP2013/059700, filed on Mar. 29, 2013.

(51) Int. Cl.
  *G06F 13/00* (2006.01)
  *G06F 13/40* (2006.01)
  *G06F 1/32* (2006.01)

(52) U.S. Cl.
  CPC ........ *G06F 13/4022* (2013.01); *G06F 1/3206* (2013.01); *G06F 13/4068* (2013.01); *G06F 2213/0016* (2013.01)

(58) Field of Classification Search
  None
  See application file for complete search history.

(56) References Cited

U.S. PATENT DOCUMENTS

| | | | |
|---|---|---|---|
| 5,787,261 A | 7/1998 | Osaka et al. | |
| 5,901,292 A | 5/1999 | Nishigaki et al. | |
| 6,725,320 B1 | 4/2004 | Barenys et al. | |
| 2004/0117525 A1* | 6/2004 | Lee ..................... | G06F 13/4045 710/104 |

(Continued)

FOREIGN PATENT DOCUMENTS

| | | |
|---|---|---|
| JP | 03-147043 | 6/1991 |
| JP | 08-211975 | 8/1996 |

(Continued)

OTHER PUBLICATIONS

Japanese Office Action dated Jun. 14, 2016 for corresponding Japanese Patent Application No. 2015-507905, with Partial English Translation, 4 pages.

(Continued)

*Primary Examiner* — Henry Tsai
*Assistant Examiner* — Dean Phan
(74) *Attorney, Agent, or Firm* — Fujitsu Patent Center

(57) ABSTRACT

A coupling controller that performs coupling control of a device with a bus includes a decision circuit configured to decide whether a voltage level of a signal inputted from each of a plurality of signal lines included in the bus is lower than a given threshold value, and a switching controller configured to perform switching control for a switching unit, which is interposed between the bus and the device and switches coupling between each of the plurality of signal lines and the device, such that the signal line with regard to which it is decided by the decision circuit that the voltage level of the signal is lower than the given threshold value is coupled with the device.

14 Claims, 17 Drawing Sheets

(56) References Cited

U.S. PATENT DOCUMENTS

2007/0043893 A1   2/2007  Ishii
2014/0164660 A1*  6/2014  DeCesaris ........... G06F 13/4291
                                                    710/113
2014/0337553 A1* 11/2014  Du ......................... G06F 13/24
                                                    710/267

FOREIGN PATENT DOCUMENTS

| JP | 09-44280    | 2/1997 |
| JP | 09-237140   | 9/1997 |
| JP | 2004-528627 | 9/2004 |
| JP | 2007-52543  | 3/2007 |
| JP | 2008-197752 | 8/2008 |

OTHER PUBLICATIONS

International Search Report and Written Opinion of the International Searching Authority (Form PCT/ISA/210, Form PCT/ISA/237), mailed in connection with PCT/JP2013/059700 and dated Apr. 23, 2013, with partial English translation (7 pages).

* cited by examiner

COUPLING CONTROLLER, INFORMATION PROCESSING APPARATUS AND COUPLING CONTROL METHOD

CROSS-REFERENCE TO RELATED APPLICATION

This application is a continuation application of International Application PCT/JP2013/059700 filed on Mar. 29, 2013 and designated the U.S., the entire contents of which are incorporated herein by reference.

FIELD

The present technology relates to a coupling controller, an information processing apparatus and a coupling control method.

BACKGROUND

In an information processing apparatus such as a server or a personal computer, a two-line type serial bus similar to an I2C (registered trademark) bus is sometimes used. The two-line type serial bus is used, for example, for coupling of a device of a comparatively low speed such as a peripheral device.

When a unit having a device is hot-line connected into a two-line type serial bus, a phenomenon sometimes appears that current flows from a bus line to the terminal side of the unit but within a very short time period (for example, several nano-seconds) through a capacitor component (stray capacitance) of a signal line in the inside of the unit.

FIG. 14 is a view illustrating an influence on a bus line by a stray capacitance in the inside of a unit when the unit is hot-line connected into the bus line. As depicted in FIG. 14, the unit has a stray capacitance that depends upon an internal circuit. While the bus line is maintained at a given voltage level by a pull-up resistor, if the unit is hot-line connected into the bus line, then charge current i to the stray capacitance of the unit flows from the bus line. At this time, since the voltage level of the bus line drops instantaneously by outflow of the current i from the bus line to the unit, there is the possibility that some other device coupled with the two-line type serial bus may malfunction.

For example, a method described is known in order to prevent malfunction of some other device by addition of a unit to a two-line type serial bus.

FIGS. 15 and 16 are views depicting examples of a configuration of information processing apparatus 100 and 100' individually including an I2C bus.

First, the example depicted in FIG. 15 is described. As depicted in FIG. 15, the information processing apparatus 100 includes an Micro Processing Unit (MPU) 120, an I2C bus controller 130, an IO_PORT input 110, an IO_PORT output 111 and bus switches 140a and 140b. Further, the information processing apparatus 100 includes pull-up resistors 150 and 160, a connector 170, a power supplying unit 180 and I2C devices 210-2 and 210-3. Further, an additional unit 200 includes an I2C device 210-1, a power supply unit 220 and a connector 230.

The MPU 120 is a processor that performs monitoring and control of the I2C devices 210-1 to 210-3 (where the I2C devices 210-1 to 210-3 are not distinguished from each other, each of them is hereinafter referred to simply as I2C device 210). The MPU 120 is coupled with the IO_PORT input 110, IO_PORT output 111 and I2C bus controller 130 through a local bus 310.

The IO_PORT input 110 detects that the additional unit 200 is connected to the information processing apparatus 100. Here, the IO_PORT input 110 is coupled with the connector 170 through amounting signal line 340 maintained at a given voltage level by the pull-up resistor 160. Further, a mounting signal line 340 that is coupled to the ground (GND) is coupled with the connector 230 of the additional unit 200. If the connector 170 is coupled with the connector 230, then the mounting signal line 340 is coupled to the GND through the mounting signal line 420. Therefore, the IO_PORT input 110 detects, when the voltage of the mounting signal line 340 drops, that the additional unit 200 is connected to the information processing apparatus 100.

The I2C bus controller 130 is coupled with the I2C device 210 through a serial bus (I2C bus) 320 maintained at a given voltage level by the pull-up resistor 150 and performs communication control of a data signal and a clock signal with the I2C device 210.

The BUS-SWs (bus switches) 140a and 140b are switches interposed between a data signal line (SDA) 320a and a clock signal line (SCL) 320b included in the serial bus 320 and the connector 170, respectively. The bus switches 140a and 140b switch coupling between the corresponding signal lines and the I2C device 210-1 of the additional unit 200 coupled through the connectors 170 and 230, respectively. It is to be noted that both of the bus switches 140a and 140b are placed into a disable state if the additional unit 200 is coupled with the connector 170 and release the coupling between the serial bus 320 and the I2C device 210-1, namely, place the coupling into a cut state.

The IO_PORT output 111 performs switching of coupling by the bus switches 140a and 140b through control lines 330a and 330b under the control of the MPU 120.

It is to be noted that, if the connector 230 of the additional unit 200 is connected to the connector 170, then the power supplying unit 180 supplies power to the power supply unit 220.

In the information processing apparatus 100 configured in such a manner as described above, if the additional unit 200 is mounted, then the IO_PORT input 110 detects connection of the additional unit 200 through variation of a mounting signal of the mounting signal line 340 from High to Low (refer to an arrow mark (1) of FIG. 15).

If it is recognized by referring to the IO_PORT input 110 that the additional unit 200 is connected, then the MPU 120 causes the I2C bus controller 130 to temporarily stop operation for bus access of the serial bus 320 (refer to an arrow mark (2) of FIG. 15).

Further, within a time period within which the serial bus 320 stops, the MPU 120 controls the IO_PORT output 111 to switch the bus switches 140a and 140b to an enable state (refer to an arrowmark (3) of FIG. 15). Consequently, the bus switches 140a and 140b are closed and the SDA 320a and the SDA 410a of the additional unit 200 are rendered conducting, and the SCL 320b and the SCL 410b of the additional unit 200 are rendered conducting.

If the bus switches 140a and 140b are switched to an enable state, then the I2C bus controller 130 restarts operation for bus access to perform bus access to the I2C device 210-1 of the additional unit 200 (refer to an arrow mark (4) of FIG. 15).

By the operation described above, the MPU 120 temporarily stops the bus access of the serial bus 320 and couples the additional unit 200 to the serial bus 320. Consequently, an influence of noise (voltage drop) upon contact of the additional unit 200 with the bus line by a capacitor component (stray capacitance) of the signal line of the additional unit 200 can be suppressed. In particular, since the noise of voltage drop appearing when the additional unit 200 is coupled with the connector 170 is separated by the bus switches 140a and 140b in a disable state, an influence is not had on the serial bus 320.

Now, the example depicted in FIG. 16 is described. While, as depicted in FIG. 16, the information processing apparatus 100' includes a configuration similar to that of the information processing apparatus 100 depicted in FIG. 15, the information processing apparatus 100' is different from the information processing apparatus 100 in that an I2C bus multiplexer 112 is included in place of the IO_PORT output 111 and bus switches 140a and 140b.

The I2C bus multiplexer 112 is an I2C device interposed between the serial bus 320 and the I2C device 210 and connector 170. It is to be noted that, as the I2C bus multiplexer 112, a PCA9542 fabricated by NXP Semiconductors or the like is available.

The I2C bus multiplexer 112 performs channel switching of the serial bus 320 between a channel 1 for the I2C devices 210-2 and 210-3 in the inside of the information processing apparatus 100' and a channel 2 for the I2C device 210-1 of the additional unit 200. In particular, the I2C bus multiplexer 112 performs channel switching at a timing at which the bus is not in a busy state. It is to be noted that the I2C bus multiplexer 112 includes a register in the inside thereof, and, if a value indicating channel switching is written into the register through the I2C bus controller 130 by the MPU 120, then the I2C bus multiplexer 112 starts detection of a timing at which the bus is not in a busy state.

In the information processing apparatus 100' configured in such a manner as described above, if the additional unit 200 is connected, then the IO_PORT input 110 detects the connection of the additional unit 200 similarly to the information processing apparatus 100 (refer to an arrow mark (1) of FIG. 16).

After the detection of the connection of the additional unit 200, the MPU 120 performs channel switching control for the internal register of the I2C bus multiplexer 112 through the serial bus 320 before accessing to the additional unit 200 (refer to an arrow mark (2') of FIG. 16).

The I2C bus multiplexer 112 performs switching from the channel 1 to the channel 2 at a timing at which the bus is not in a busy state based on the value of the internal register (refer to an arrow mark (3') of FIG. 16).

If the channel is switched by the I2C bus multiplexer 112, then the I2C bus controller 130 performs bus access to the I2C device 210-1 of the additional unit 200 (refer to an arrow mark (4) of FIG. 16).

By the operation described above, when the bus is not in a busy state, the I2C bus multiplexer 112 switches the channel to couple the additional unit 200 with the serial bus 320. Consequently, similarly as in the example depicted in FIG. 15, an influence of noise (voltage drop) upon contact of the additional unit 200 with the bus line by the capacitor component (stray capacitance) of the signal line of the additional unit 200 can be suppressed. In particular, since noise of voltage drop appearing when the additional unit 200 is coupled with the connector 170 is separated by the I2C bus multiplexer 112, an influence is not had on the serial bus 320.

It is to be noted that, as a related technology, an exchanging technique of a module during online operation of a system is available (for example, refer to Japanese Laid-open Patent Publication No. 9-44280). In the technology, a bus switch performs coupling/decoupling of a module at a timing at which malfunction does not occur even if noise appearing upon insertion/removal of the module is received by some other module coupled with the bus.

Here, an example depicted in FIG. 17 is available as a timing at which malfunction does not occur even if noise is received by some other module. FIG. 17 is a view illustrating a timing of coupling or decoupling of a module with or from a bus. For example, in a parallel bus, some other module receives data at a timing of a rising edge of a bus clock. In other words, even if noise is generated when an additional modules is coupled with a bus, if the noise has disappeared when data is received in synchronism with the bus clock, then some other module can receive data (data "B" of FIG. 17) without being influenced by the noise.

Further, as a different related technology, a technology is known that a coupling state between a bus and a unit is switched in response to a state of the bus or the unit by a switch interposed between the bus and the unit (for example, refer to Japanese Laid-open Patent Publication No. 2008-197752 and Japanese National Publication of International Patent Application No. 2004-528627).

Further, a technology is known that the potential level of a bus of a computer main body is controlled to set the potential level to a potential level equal to that of a bus at the expansion unit side so that bus coupling with an expansion unit is achieved when a bus cycle is in an execution state (for example, refer to Japanese Laid-open Patent Publication No. 9-237140).

In the information processing apparatus 100 depicted in FIG. 15, the MPU 120 stops operation of the I2C bus 320 under the control of software for the I2C bus controller 130. While it is originally desirable to place such a shared bus as the I2C bus 320 in a state in which the bus can always access a device, in the information processing apparatus 100, it is difficult to perform continuous access to the different device 210 when the additional unit 200 is coupled with the shared bus.

Further, in the information processing apparatus 100' depicted in FIG. 16, the I2C bus 320 is branched and is complicated in bus configuration by the provision of the I2C bus multiplexer 112. In order to add an additional unit 200 to the complicated bus configuration, the MPU 120 performs channel switching control by software for the I2C bus multiplexer 112. Accordingly, the information processing apparatus 100' has, in addition to the difficulty of performing the continuous access to the different device 210 when the additional unit 200 is coupled with the shared bus similar to that of the information processing apparatus 100, there is a possibility that delay of processing occurs in the channel switching control by the MPU 120.

Further, the technology described hereinabove with reference to FIG. 17 is applied to a parallel bus. Even if the technology is applied to an I2C (serial) bus, when noise appears on a clock signal upon coupling of an additional module, there is the possibility that some other module may fetch data in error.

It is to be noted that, in the technology described above that a coupling state between a bus and a unit is switched by a switch in response to the state of the bus or the unit, it is not taken into consideration that an influence of noise appearing when the unit is coupled is suppressed.

Further, since, in the technology that the potential level of a bus of a computer main body is controlled to set the potential level to a potential level equal to that of a bas at the expansion unit side, complicated control by software is performed, there is a possibility that delay of a coupling process of the expansion unit occurs.

As described above, in the technologies described above, a bus is subject to various influences upon coupling of a device.

SUMMARY

According to an aspect of the embodiments, a coupling controller that performs coupling control of a device with a bus, includes a decision circuit configured to decide whether a voltage level of a signal inputted from each of a plurality of signal lines included in the bus is lower than a given threshold value, and a switching controller configured to perform switching control for a switching unit, which is interposed between the bus and the device and switches coupling between each of the plurality of signal lines and the device, such that the signal line with regard to which it is decided by the decision circuit that the voltage level of the signal is lower than the given threshold value is coupled with the device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the following, embodiments are described with reference to the drawings.

[1] First Embodiment

[1-1] Description of Information Processing Apparatus

Figure 1:
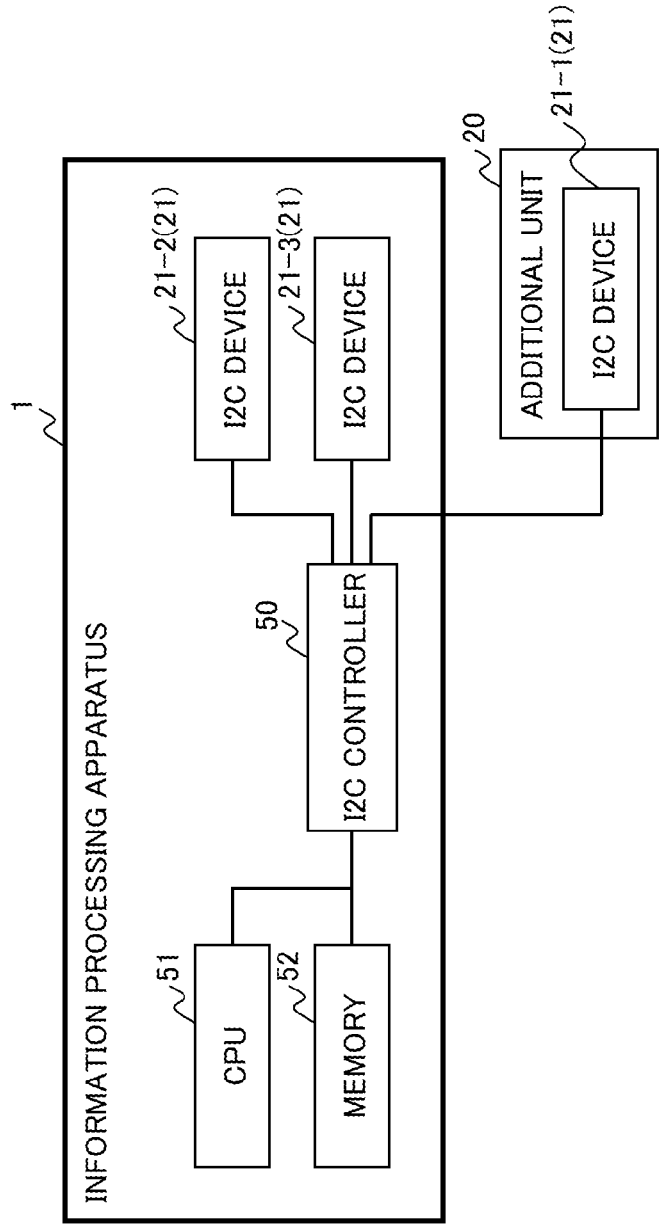
FIG. 1 is a view depicting an example of a configuration of an information processing apparatus according to a first embodiment.

FIG. 1 is a view depicting an example of a configuration of an information processing apparatus 1 according to the first embodiment. As depicted in FIG. 1, the information processing apparatus 1 includes an I2C controller 50, a Central Processing Unit (CPU) 51, a memory 52 and I2C devices 21-2 and 21-3.

The CPU (processor) 51 is a processing unit that performs various controls and arithmetic operations. The CPU 51 implements various functions by executing a program stored in the memory 52, a Read Only Memory (ROM) not depicted or the like. It is to be noted that the CPU 51 is coupled with the memory 52 and the I2C controller 50 through a system bus.

The memory 52 is a storage unit that temporarily stores various data and programs therein, and is used when the CPU 51 executes the program by temporarily storing and developing the data or the program. It is to be noted that, as the memory 52, a volatile memory such as, for example, a Random Access Memory (RAM) is available.

The I2C controller 50 is an apparatus that performs various controls for the I2C devices 21-2 and 21-3 through an I2C bus that is an example of a two-line type serial bus. Further, the I2C controller 50 according to the first embodiment performs various controls hereinafter described in order to couple an additional unit (I2C unit) 20 including an I2C device 21-1 with an I2C bus. For example, the I2C controller 50 may be a monitoring apparatus that performs monitoring of the information processing apparatus 1 including the I2C device 21.

The I2C devices 21-1 to 21-3 (where the I2C devices 21-1 to 21-3 are not distinguished from each other, each of them is hereinafter referred to simply as I2C device 21) are devices capable of being hot-line coupled with the information processing apparatus 1. For example, as the I2C device 21, not only a storage apparatus such as a Hard Disk Drive (HDD) or a Solid State Drive (SSD) but also various devices that comply with the I2C such as a control apparatus for a fan, a sensor or a power supply or a monitoring apparatus are available.

[1-2] Description of I2C Controller

Now, a configuration of the I2C controller 50 is described with reference to FIG. 2.

Figure 2:
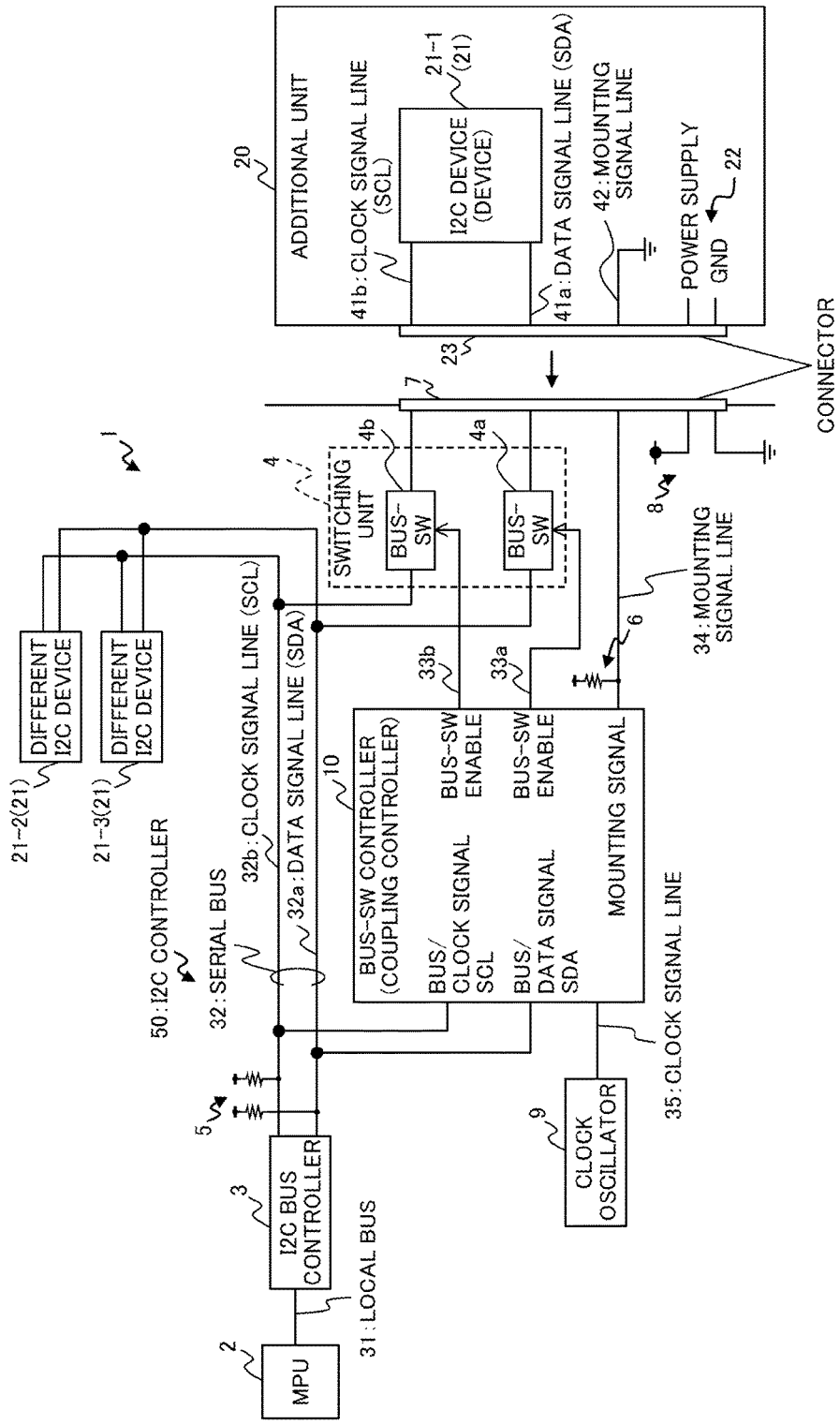
FIG. 2 is a view depicting an example of a configuration of an I2C controller depicted in FIG. 1.

As depicted in FIG. 2, the I2C controller 50 includes a BUS-SW (bus switch) controller 10, an MPU 2, an I2C bus controller 3, bus switches 4a and 4b, pull-up resistor 5 and 6, a connector 7, a power supplying unit 8 and a clock oscillator 9.

Figure 15:
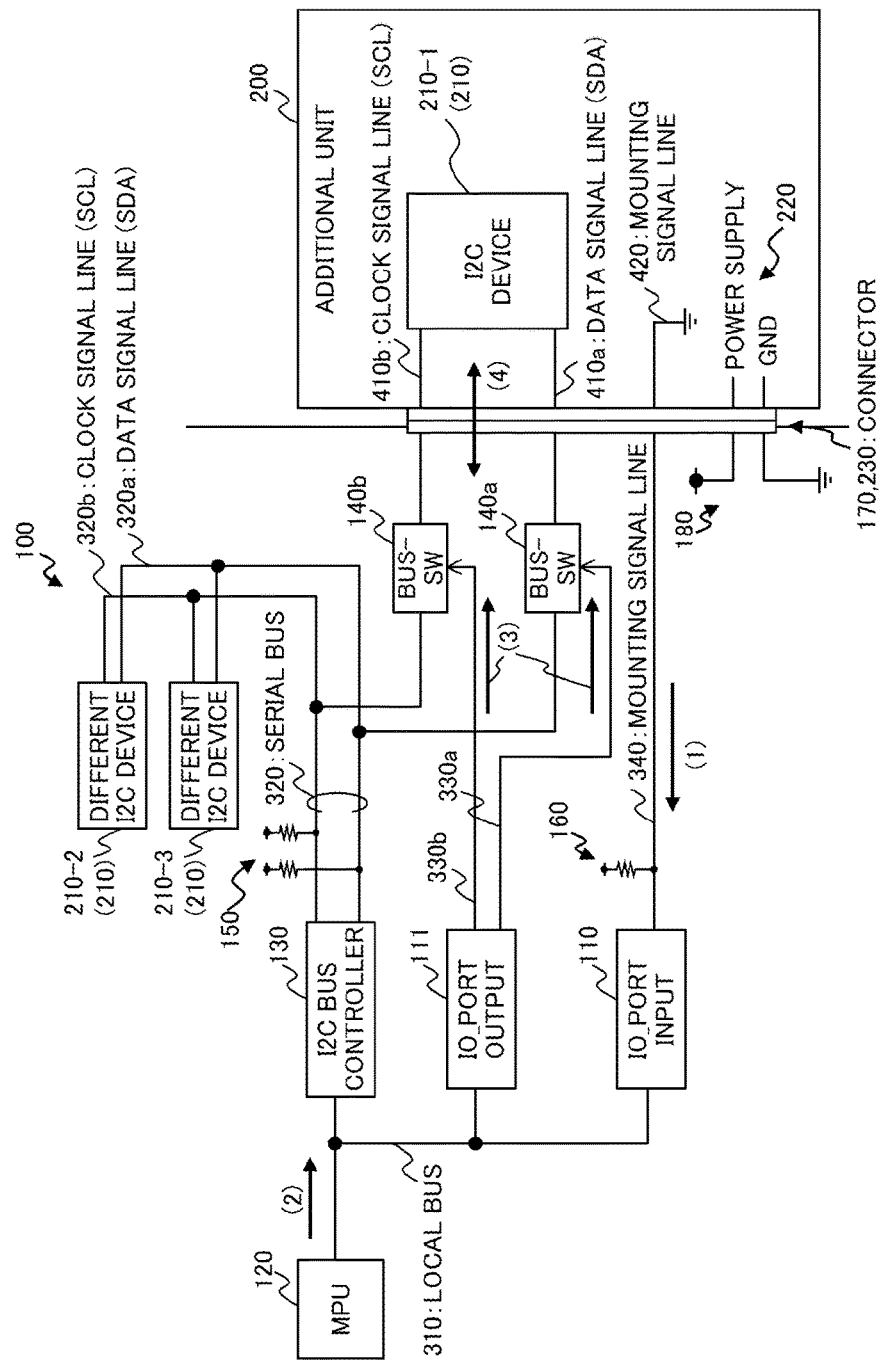
FIGS. 15 and 16 are views depicting examples of a configuration of the information processing apparatus having an I2C bus.
Figure 16:
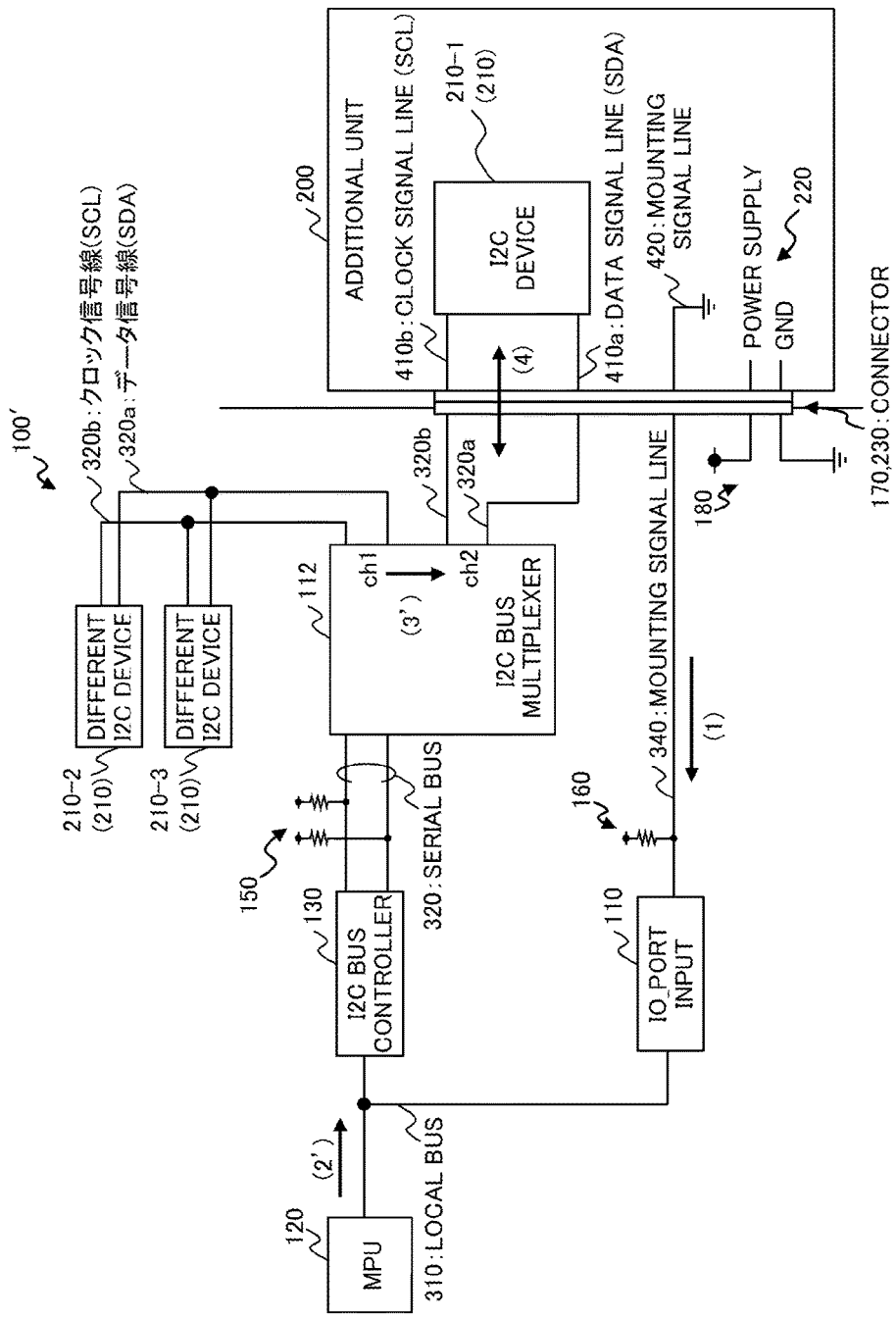

Further, the additional unit 20 has a configuration similar to that of the additional unit 200 depicted in FIG. 15 or 16 and includes an I2C device 21-1, a power supply unit 22 and a connector 23.

The MPU 2 is a processor that executes various controls by executing firmware stored in a ROM or the like not depicted. For example, the MPU 2 is coupled with the I2C bus controller 3 through the local bus 31 and performs monitoring and control of the I2C devices 21-1 and 21-3.

The I2C bus controller 3 is coupled with the I2C device 21 through the serial bus (bus) 32 maintained at a given potential level by the pull-up resistor 5 and performs communication control of a data signal and a clock signal with the I2C device 21 under the control of the MPU 2.

In particular, as depicted in FIG. 2, a data signal line (SDA) 32a and a clock signal line (SCL) 32b included in the serial bus 32 are coupled with the pull-up resistors 5, and voltages of the signal lines are adjusted by the pull-up resistors 5, respectively. For example, the SDA 32a and the SCL 32b are adjusted by the pull-up resistors 5 such that the voltage level applied from the I2C bus controller 3 maintains a given level indicated by Vhigh (High) or Vlow (Low) (refer to FIGS. 4 and 5).

It is to be noted that, though not depicted in FIG. 2, at least one of the MPU 2 and the I2C bus controller 3 is coupled with the CPU 51 depicted in FIG. 1 through the system bus and performs the control described above in response to a request from the CPU 51.

The BUS-SWs (bus switches, switches) 4a and 4b are switches interposed between the SDA 32a and SCL 32b, and the connector 7, respectively. The bus switches 4a and 4b perform switching of coupling and decoupling with and from the additional unit 20 (I2C device 21-1) coupled through the connectors 7 and 23 individually for the corresponding signal lines. It is to be noted that both of the bus switches 4a and 4b are placed into a disable state when the additional unit 20 is connected to the connector 7 such that coupling between the serial bus 32 and the I2C device 21-1 is released, namely, the serial bus 32 and the I2C device 21-1 are placed into a decoupled state.

Accordingly, the bus switches 4a and 4b are an example of a switching unit 4 that is interposed between the serial bus 32 and the I2C bus controller 3 and performs switching of coupling between the plurality of signal lines (SDA 32a and SCL 32b) and the I2C device 21. It is to be noted that, while the example is described here in which the switching unit 4 is the bus switches 4a and 4b, the present technology is not limited to this and the switching unit 4 may be implemented by one switch device if switching of coupling between the plurality of signal lines and the I2C device 21 can be performed individually.

The connector 7 connects the I2C controller 50 and the additional unit 20 to each other by contacting with the connector 23 of the additional unit 20 by fitting or the like. In particular, the connector 7 causes the SDA 32a, SCL 32b, mounting signal line 34 and power supplying unit 8 at the I2C controller 50 and the SDA 41a, SCL 41b, mounting signal line 42 and power supply unit 22 at the additional unit 20 to contact (render conducting) with each other, respectively.

The mounting signal line 34 is a signal line for coupling the bus switch controller 10 and the connector 7 and is maintained at a given voltage level by the pull-up resistor 6. On the other hand, the GND-coupled (grounded) mounting signal line 42 is connected to the connector 23 of the additional unit 20.

If the connector 23 of the additional unit 20 is connected to the connector 7, then the power supplying unit 8 supplies power to the power supply unit 22.

The clock oscillator 9 produces a clock signal to be used for performing sampling in the bus switch controller 10. It is to be noted that the clock signal produced by the clock oscillator 9 has a sufficiently higher (for example, higher by approximately ten times) frequency than that of the clock signal in the SDA 32a. It is to be noted that, as the clock oscillator 9, an oscillator for which an LC circuit is used, a crystal oscillator or the like is available.

The bus switch controller (coupling controller) 10 is an apparatus for performing coupling control of the I2C device 21 with the serial bus 32. As depicted in FIG. 2, to the bus switch controller 10, the SDA 32a and SCL 32b branched from the serial bus 32, mounting signal line 34 and clock signal line 35 are coupled such that signals from the signal lines are received as input signals thereto. Further, as depicted in FIG. 2, the bus switch controller 10 is coupled with the bus switches 4a and 4b through BUS-SW ENABLEs (hereinafter referred to as control lines) 33a and 33b and controls the bus switches 4a and 4b.

Figure 3:
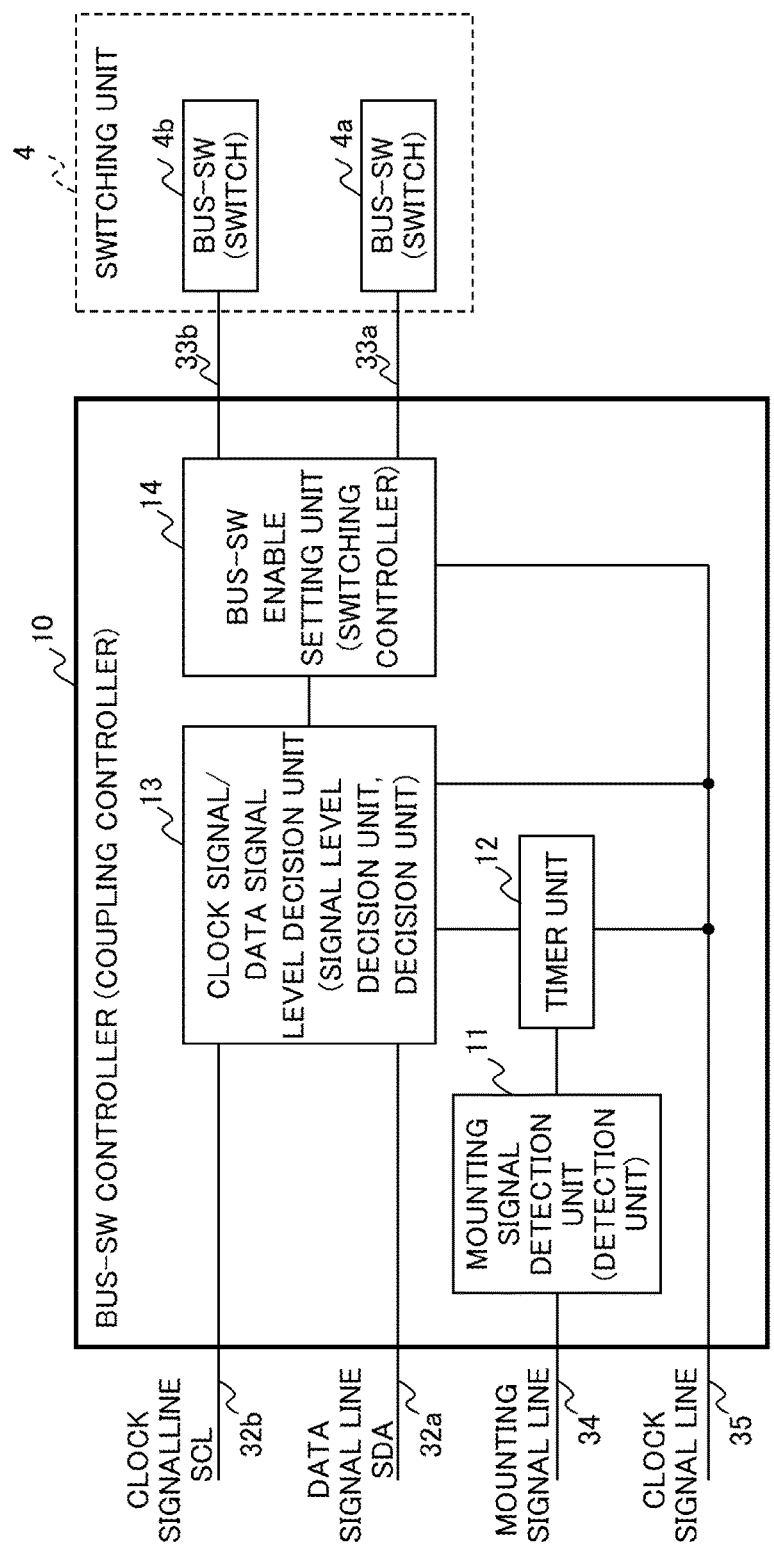
FIG. 3 is a view depicting an example of a configuration of a BUS-SW controller depicted in FIG. 2.
Figure 4:
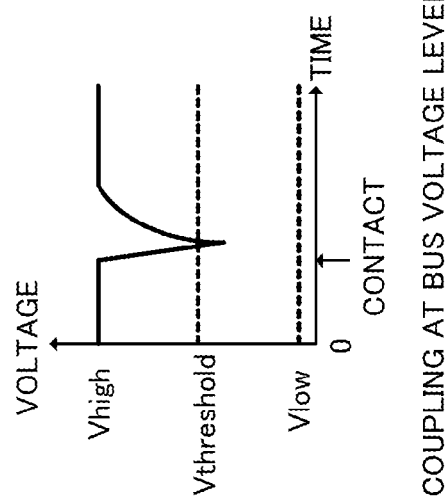
FIGS. 4 and 5 are views each illustrating a voltage level of a serial bus when an additional unit is hot-line connected into the serial bus depicted in FIG. 2.
Figure 5:
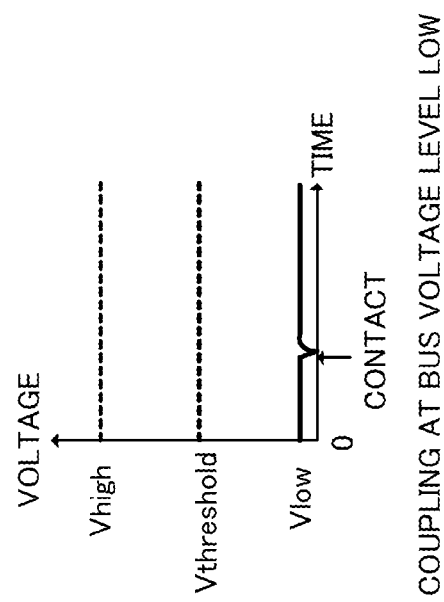
Figure 6:
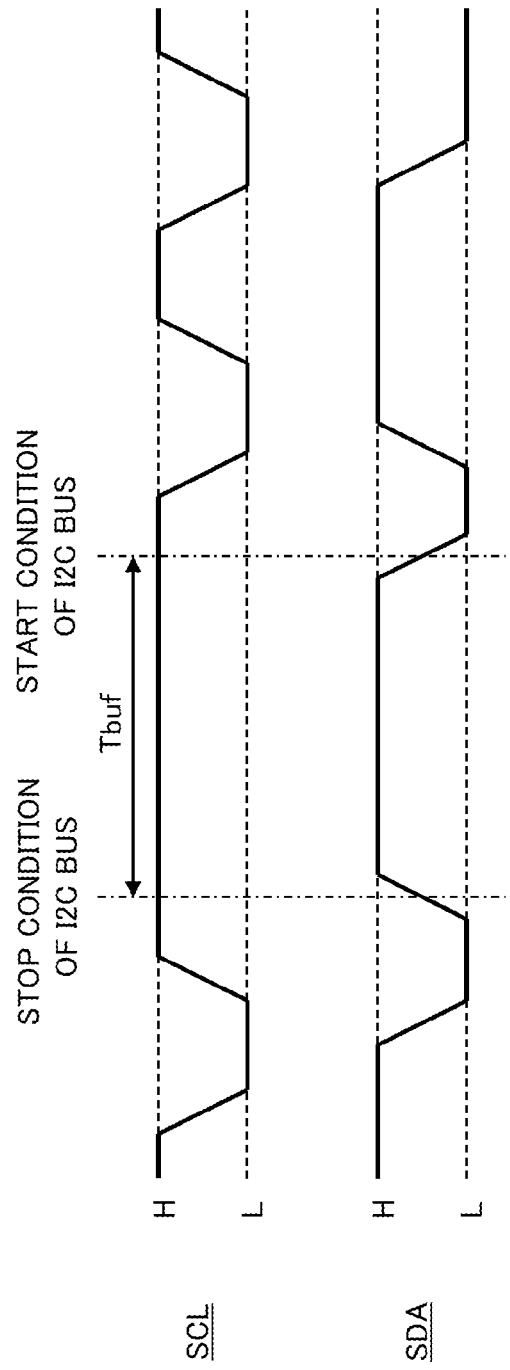
FIG. 6 is a view illustrating transition of a communication state of the serial bus depicted in FIG. 2.

A configuration of the bus switch controller 10 is described with reference to FIGS. 3 to 6. FIG. 3 is a view depicting an example of a configuration of the bus switch controller 10 depicted in FIG. 2 and FIGS. 4 and 5 are views illustrating a voltage level of the serial bus 32 when the additional unit 20 is hot-line connected into the serial bus 32 depicted in FIG. 2. FIG. 6 is a view illustrating transition of a communication state of the serial bus 32 depicted in FIG. 2.

As depicted in FIG. 3, the bus switch controller 10 includes a mounting signal detection unit 11, a timer unit 12, a clock signal/data signal level decision unit 13 and a BUS-SW ENABLE (bus switch enable) setting unit 14.

The mounting signal detection unit (detection unit) 11 receives a mounting signal from the mounting signal line 34 as an input signal thereto to detect that the I2C unit 20 (I2C device 21) is coupled with the connector 7 (bus switches 4a and 4b). For example, if the connector 7 is connected to the connector 23, then the mounting signal line 34 is GND-coupled through the mounting signal line 42. If it is detected that the voltage of the mounting signal line 42 drops, then the mounting signal detection unit 11 detects that the I2C device 21 is coupled with the bus switches 4a and 4b. The detection unit 11 is an example of a detection circuit.

The timer unit 12 performs time counting for a given period. As the timer unit 12, for example, not only a counter circuit but also various circuits capable of counting time can be used. The timer unit 12 is an example of a timer.

The BUS-SW ENABLE setting unit (switching controller) 14 performs switching control so as to cause the switching unit 4 to couple a signal line, with regard to which it is decided by the signal level decision unit 13 that the signal intensity (voltage level) is lower than a given threshold value, with the I2C device 21. In particular, the BUS-SW ENABLE setting unit 14 performs control for switching the bus switch 4a or 4b corresponding to the SDA 32a or the SCL 32b detected by the signal level decision unit 13 from a decoupling state to a coupling state.

For example, when the additional unit 20 is connected to the I2C controller 50, the BUS-SW ENABLE setting unit 14 controls the voltage level of the control lines 33a and 33b to Low (disable) so that the bus switches 4a and 4b are opened and are placed into a decoupling state. On the other hand, the BUS-SW ENABLE setting unit 14 controls the voltage level of the control lines 33a and 33b to High (enable) in response to the instruction from the signal level decision unit 13 so that the bus switches 4a and 4b are closed and are placed into a coupling state.

The clock signal/data signal level decision unit (decision unit, hereinafter referred to simply as signal level decision unit) 13 detects a timing at which the magnitude of noise, which appears when the additional unit 20 is brought into contact with the serial bus 32, by capacitor components of the signal lines in the additional unit 20 is minimized. The decision unit 13 is an example of a decision circuit.

In particular, if it is detected by the mounting signal detection unit 11 that the I2C device 21 is connected to the bus switches 4a and 4b, then the signal level decision unit 13 monitors the voltage level of the signals inputted from the SDA 32a and the SCL 32b, respectively. Then, the signal level decision unit 13 decides whether the voltage level of the signals inputted from the SDA 32a and the SCL 32b is lower than the given threshold value (Vthreshold), respectively. More particularly, the signal level decision unit 13 samples the signals inputted from the SDA 32a and the SCL 32b using the clock signal inputted from the clock oscillator 9. Then, the signal level decision unit 13 decides whether the voltage level of each signal is High or Low from a result of the sampling.

A relationship between a timing at which the additional unit 20 is hot-line coupled into the serial bus 32 and the voltage level of the serial bus 32 is described below with reference to FIGS. 4 and 5.

As depicted in FIG. 4, when the signal level of the signal of the SDA 32a or the SCL 32b of the serial bus 32 is Vhigh, if the additional unit 20 is coupled with the serial bus 32 at a timing of "contact" in FIG. 4, then the deflection of the voltage drop by a stray capacitance is great. Since, in the example depicted in FIG. 4, the voltage level of the SDA 32a or the SCL 32b drops to the proximity of the threshold value (Vthreshold), there is the possibility that the different I2C device 21 coupled with the system bus 32 may malfunction.

On the other hand, when the voltage level of the signal of the SDA 32a or the SCL 32b is Vlow as depicted in FIG. 5, since the voltage level originally is in a Low state, the different I2C device 21 does not malfunction even if a voltage drop arising from a stray capacitance occurs. In particular, by coupling the additional unit 20 with the system bus 32 when the voltage level of the bus line is in a Low state, the influence of noise by the capacitor components of the additional unit 20 can be suppressed.

Therefore, the signal level decision unit 13 decides a timing at which the voltage level of the bus line becomes Low as described above and issues an instruction for switching control to the BUS-SW ENABLE setting unit 14 regarding the bus line (SDA 32a or SCL 32b) placed in the Low state.

Here, as depicted in FIG. 6, the I2C bus as an example of the serial bus 32 transits to a state of bus free time (Bus free time between STOP and START conditions; hereinafter referred to as Tbuf), which is an intermediate between a bus access and another bus access in a process of communication. The Tbuf indicates a time period between a STOP condition and a START condition, and the I2C devices 21-2 and 21-3 coupled with the serial bus 32 do not use the serial bus 32 within the time period.

As depicted in FIG. 6, the START condition of the I2C bus indicates a state when the SDA 32a drops from a High state to a Low state while the SCL 32b is in a High state, and represents starting of bus access to the I2C bus. On the other hand, as depicted in FIG. 6, the STOP condition of the I2C bus indicates a state when the SDA 32a rises from a Low state to a High state while the SCL 32b is in a High state, and represents ending of bus access to the I2C bus.

As depicted in FIG. 6, the SDA 32a and SCL 32b drop in order from a High state to a Low state in the START condition.

Therefore, the signal level decision unit 13 can detect switching from High to Low in order regarding the voltage level of the SDA 32a and the SCL 32b by detecting the Tbuf and then detecting the START condition. Then, the signal level decision unit 13 can perform the switching control individually for the bus switches 4a and 4b (BUS-SW ENABLE setting unit 14) regarding the SDA 32a and SCL 32b with regard to which switching to Low is detected.

In particular, the signal level decision unit 13 decides that the time at present is within a time period of the Tbuf when both of the voltage levels of the signals inputted from the SDA 32a and SCL 32b are equal to or higher than the given threshold value (Vthreshold) while time counting for a given time period by the timer unit 12 is being performed. Here, the Tbuf indicates a time period unique to the I2C bus and is longer than a time period of High in the clock signal of the SCL 32b. Accordingly, it is preferable to set a time period equal to or substantially equal to the Tbuf or longer than the Tbuf as a time period for counting to the timer unit 12

[1-3] Detailed Example of Configuration of Bus Switch Controlling Unit

Figure 7:
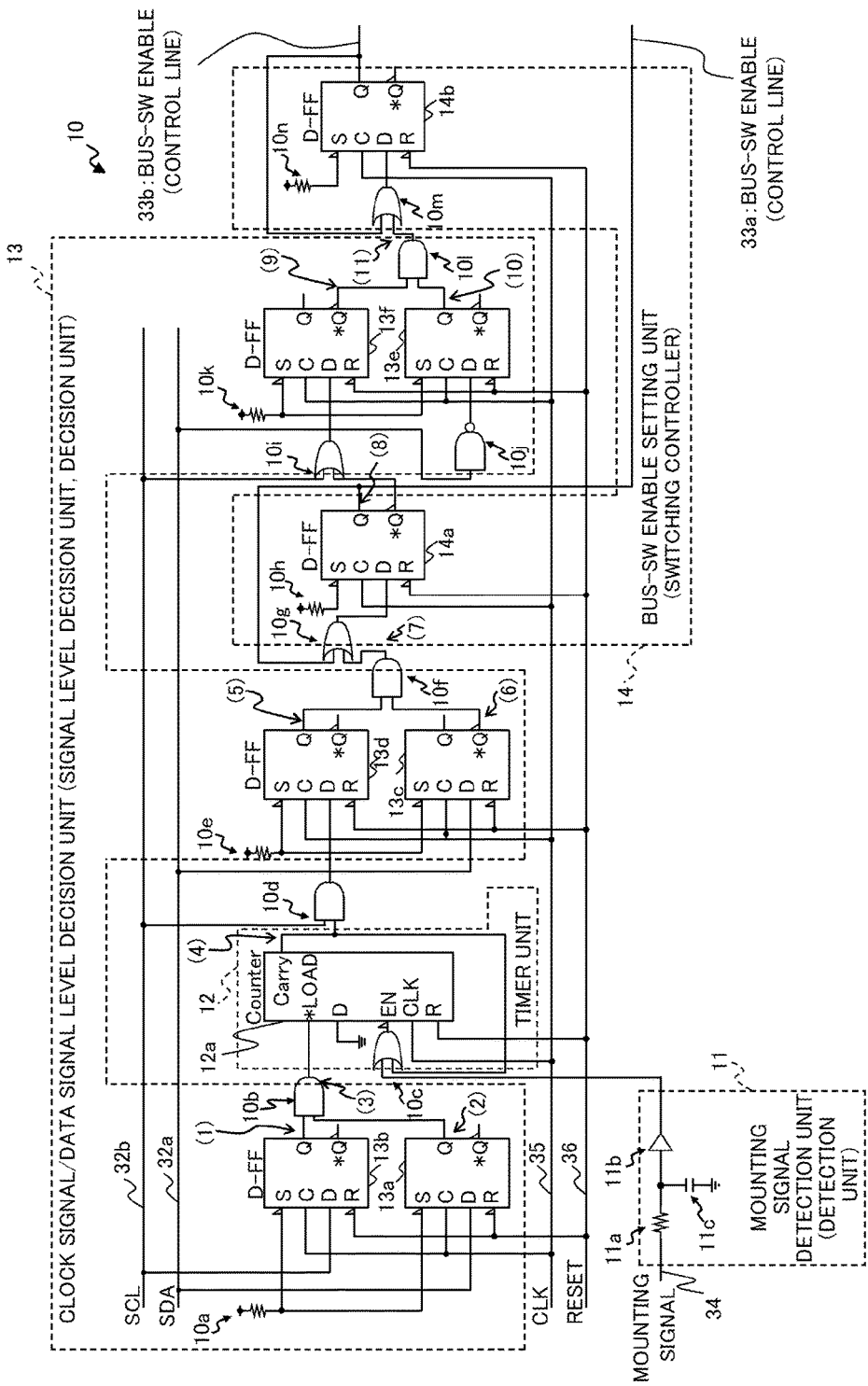
FIG. 7 is a view depicting an example of a detailed configuration of the BUS-SW controller depicted in FIG. 2.
Figure 8:
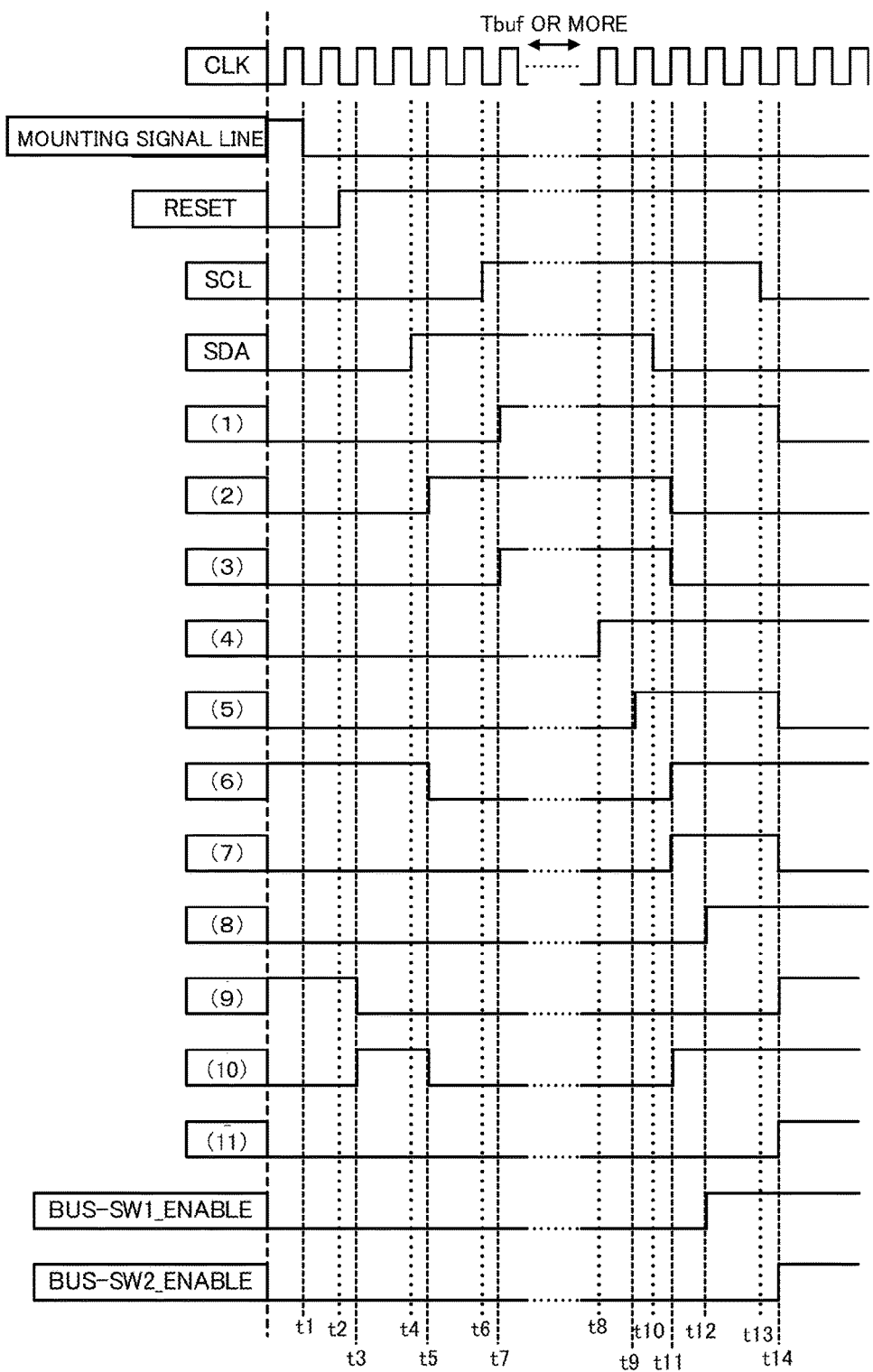
FIG. 8 is a time chart depicting an example of a state of components of the BUS-SW controller depicted in FIG. 7.

Now, an example of a detailed configuration of the bus switch controller 10 is described with reference to FIGS. 7 and 8. FIG. 7 is a view depicting an example of a detailed configuration of the bus switch controller 10 depicted in FIG. 2, and FIG. 8 is a time chart illustrating an example of a state of the components of the bus switch controller 10 depicted in FIG. 7. As depicted in FIG. 7, the bus switch controller 10 is implemented by hardware using, for example, a plurality of circuit devices.

The mounting signal detection unit 11 includes a resistor 11a coupled with the mounting signal line 34, an amplifier 11b and a capacitor 11c.

The timer unit 12 includes a counter circuit 12a and an OR circuit 10c.

The signal level decision unit 13 includes pull-up resistors 10a, 10e and 10k, AND circuits 10b, 10f and 10l, an OR circuit 10i, a NAND circuit 10j and Delay-Flip Flops (D-FFs) 13a to 13f.

The BUS-SW ENABLE setting unit 14 includes pull-up resistors 10h and 10n, OR circuits 10g and 10m and D-FFs 14a and 14b.

It is to be noted that, in FIG. 7, "RESET" indicates, for example, a reset signal line 36 of a reset signal transmitted from the MPU 2 and, if the mounting signal line 34 drops to Low, then the reset signal line 36 is maintained High.

An example of states of the clock signal line 35 from the clock oscillator 9, mounting signal line 34 from the mounting signal detection unit 11, reset signal line 36, SCL 32b, SDA 32a, components of (1) to (11) depicted in FIG. 7 and control lines 33a and 33b is described below with reference to FIG. 8. It is to be noted that, in FIG. 8, the control line 33a is denoted as "BUS-SW1_ENABLE" and the control line 33b is denoted as "BUS-SW2_ENABLE".

It is to be noted that the clock signal line 35 from the clock oscillator 9 outputs a clock signal for sampling, and the circuit devices in the bus switch controller 10 perform operation in synchronism with the clock signal.

If, at timing t1, the mounting signal line 34 shifts to Low, namely, if the additional unit 20 is connected to the system bus 32, then the reset signal line 36 is maintained at High (timing t2). Further, at timing t3, an output (9) of the D-FF 13e transits from High to Low and an output (10) of the D-FF 13f transits from Low to High.

If, at timing t4, the voltage level of the SDA 32a transits from Low to High, then an output (2) of the D-FF 13a becomes High and outputs (6) and (10) of the D-FFs 13c and 13e become Low (timing t5). It is to be noted that the D-FF 13a, 13c and 13e are D-FFs for individually monitoring the voltage level of the SDA 32a.

Then, if, at timing t6, the voltage level of the SCL 32b transits from Low to High, then an output (1) of the D-FF 13b becomes High (timing t7). Further, at timing t7, an output (3) of the AND circuit 10b, which ANDs the outputs of the D-FFs 13a and 13b, becomes High (timing t7). It is to be noted that the D-FFs 13b, 13d and 13f are D-FFs for individually monitoring the voltage level of the SCL 32b.

It is to be noted that, since the voltage level of the SDA 32a is in a High state and the voltage level of the SCL 32b transits to High at timing t6 (STOP condition), the system bus 32 is placed in a bus free-time state.

In the counter circuit 12a, since the output (3) of the AND circuit 10b is High, High is inputted to a "*LOAD" terminal. Then, the counter circuit 12a starts counting of the time period of the Tbuf at the timing t7.

If the time counting of the given time period by the counter circuit 12a is ended and the time period within which the output (3) of the AND circuit 10b is High is longer than the Tbuf, then an output (4) of the counter circuit 12a transits to High (timing t8). Further, in response to the transition of the output (4) to High, an output (5) of the D-FF 13d at the following stage of the counter circuit 12a transits to High (timing t9).

Here, if, at timing t10, the voltage level of the SDA 32a transits from High to Low, namely, if the START condition occurs, then the outputs (2) and (3) of the D-FF 13a and the AND circuit 10b become Low (timing t11). Further, at timing t11, the outputs (6) and (10) of the D-FFs 13c and 13e become High and an output (7) of the AND circuit 10f, which ANDs the outputs of the D-FFs 13c and 13d, becomes High.

Further, in response to the transition of the output (7) of the AND circuit 10f to High, the output (8) of the D-FF 14a becomes High and the voltage level of the control line 33a becomes High (timing t12). In particular, the bus switch 4a is controlled to switch to a coupling state by the BUS-SW ENABLE setting unit 14 and the SDA 42a of the I2C device 21-1 is coupled with the SDA 32a of the serial bus 32.

Then, if, at timing t13, the voltage level of the SCL 32b transits from High to Low, then the outputs (1) and (5) of the D-FFs 13b and 13d transit to Low (timing t14). Further, at timing t14, the output (7) of the AND circuit 10f, which ANDs the outputs of the D-FFs 13c and 13d, becomes Low. Further, at timing t14, the output (9) of the D-FF 13f transits to High and the output (11) of the AND circuit 10l, which ANDs the outputs of the D-FFs 13e and 13f, becomes High.

Further, in response to the transition of the output (11) of the AND circuit 10l, the output of the D-FF 14b becomes High and the voltage level of the control line 33b becomes High (timing t14). In particular, the bus switch 4b is controlled to switch to a coupling state by the BUS-SW ENABLE setting unit 14 and the SCL 41b of the I2C device 21-1 is coupled with the SCL 32b of the serial bus 32.

As described above, with the bus switch controller 10 according to the first embodiment, the signal level decision unit 13 and the BUS-SW ENABLE setting unit 14 are implemented by logic circuits. Accordingly, since an opportunity in which the additional unit 20 is coupled with the serial bus 32 is detected at a high speed by hardware to perform coupling during operation of the I2C bus, suspension of operation of the I2C bus controller 3 may be omitted in comparison with the control by software described with reference to FIG. 15. Further, a bus branch is not provided as in the I2C bus multiplexer 112 described with reference to FIG. 16, complication of a bus configuration can be suppressed. Further, the control by hardware can implement stabilized operation in comparison with the control by software which depends upon a performance of or a load to the MPU 2.

Figure 17:
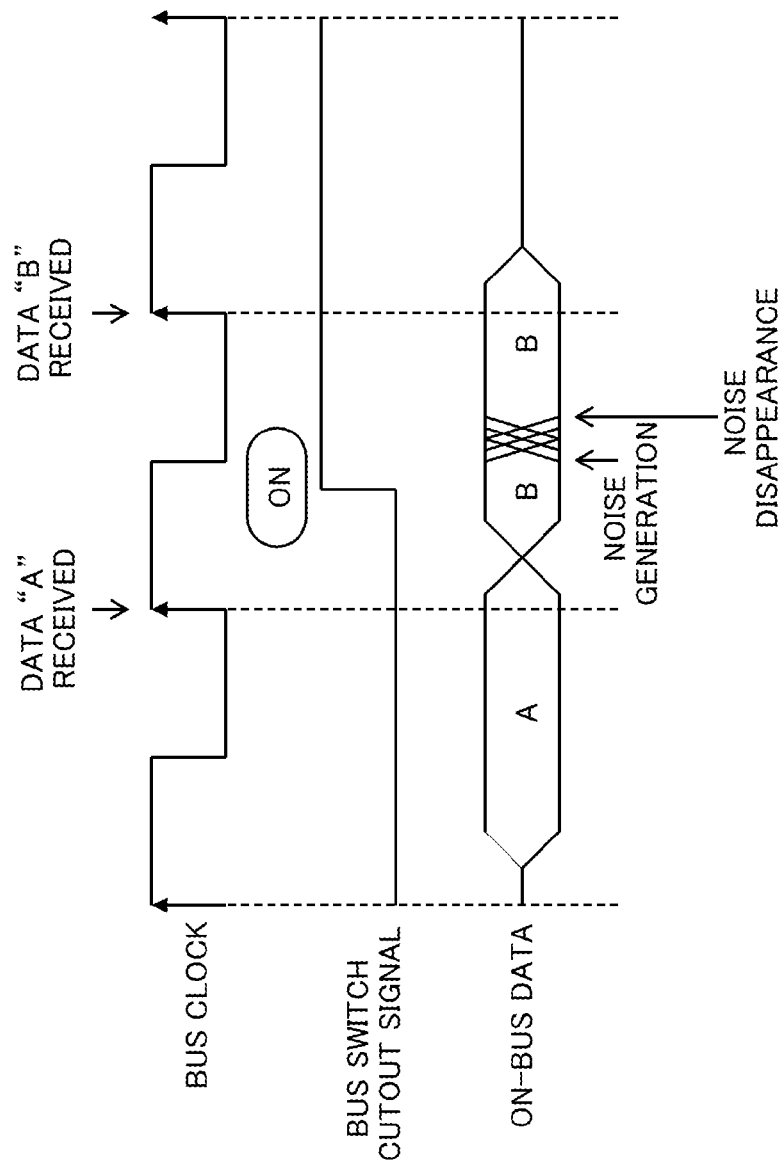
FIG. 17 is a view illustrating a timing of coupling or decoupling of a module with or from a bus.

It is to be noted that, where the technology relating to the parallel bus described hereinabove with reference to FIG. 17 is applied to the I2C bus, since there is no bus control signal in the I2C bus, there is the possibility that the I2C device 21 may recognize generated noise as the START condition or the STOP condition in error. In contrast, with the bus switch controller 10 according to the first embodiment, since the additional unit 20 is coupled with the system bus 32 when the voltage level of the bus line is in a Low state, the I2C device 21 does not cause error recognition of a state of the serial bus 32 arising from noise generated in the system bus 32.

It is to be noted that, while the example in which both of the signal level decision unit 13 and the BUS-SW ENABLE setting unit 14 are implemented by logic circuits is depicted in FIG. 7, the present technology is not limited to this. For example, a configuration may be applied that at least one of the signal level decision unit 13 and the BUS-SW ENABLE setting unit 14 includes a logic circuit. Also in this case, stabilized operation can be implemented in comparison with an alternative case in which both of the signal level decision unit 13 and the BUS-SW ENABLE setting unit 14 are implemented by the control by software.

[1-4] Example of Operation of First Embodiment

Figure 9:
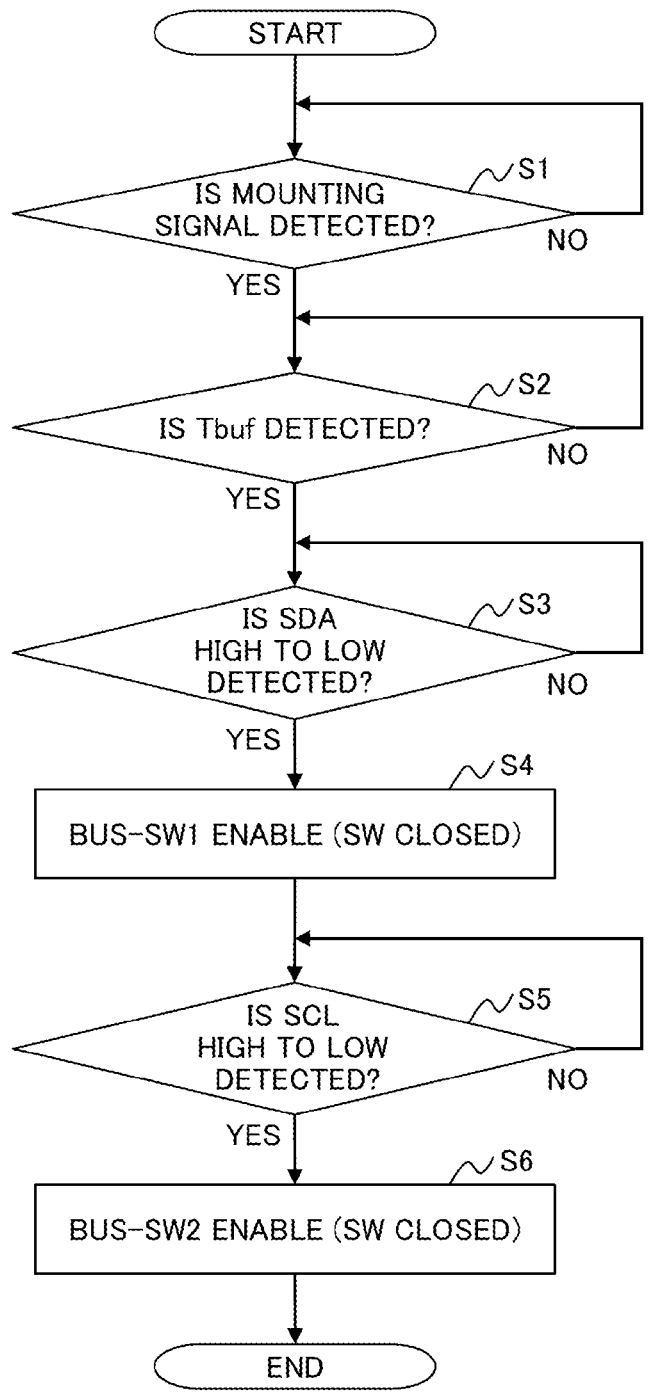
FIG. 9 is a flow chart illustrating an example of operation of the I2C controller depicted in FIG. 1.
Figure 10:
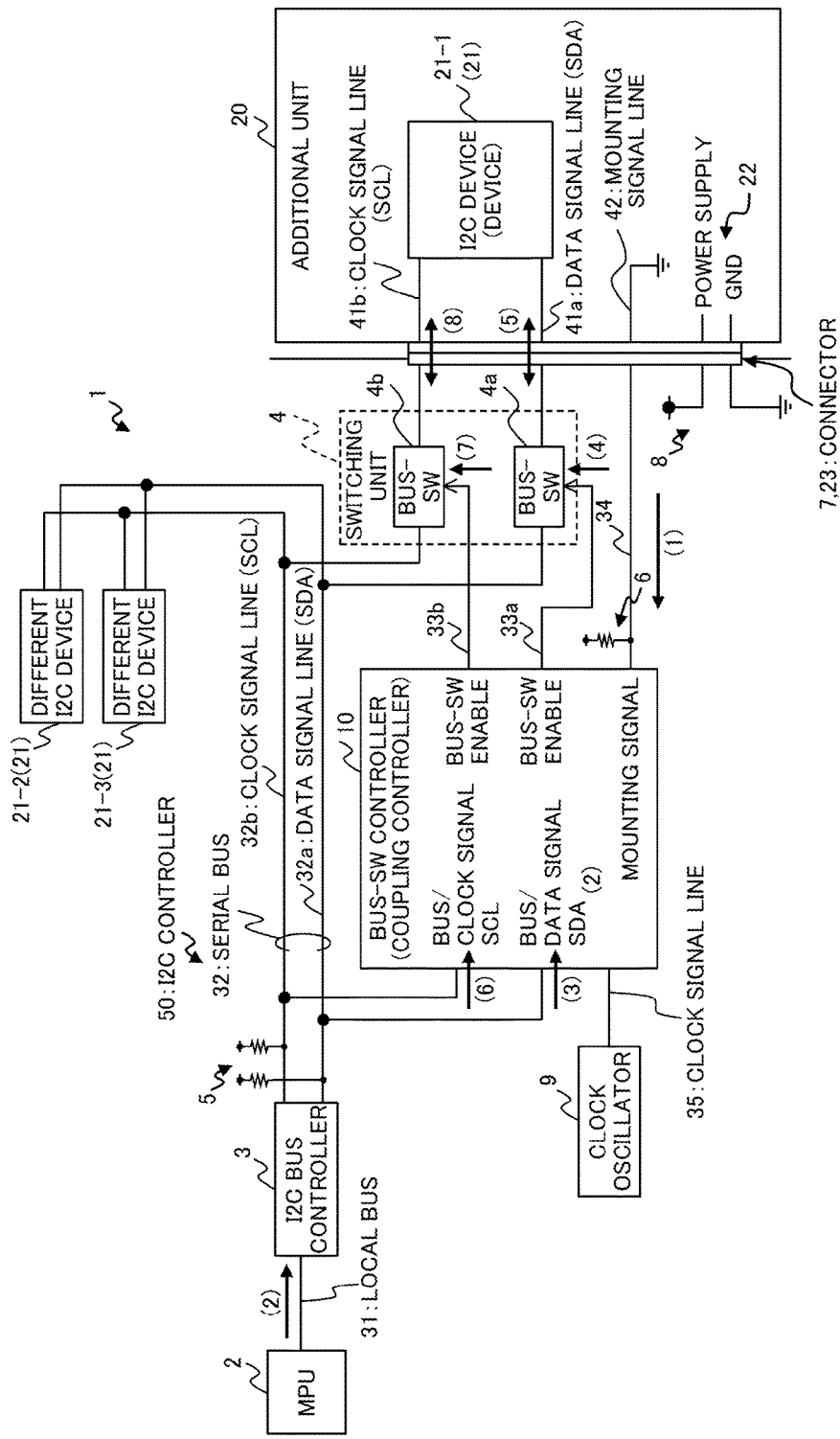
FIG. 10 is a view illustrating an example of operation of the I2C controller depicted in FIG. 1.
Figure 11:
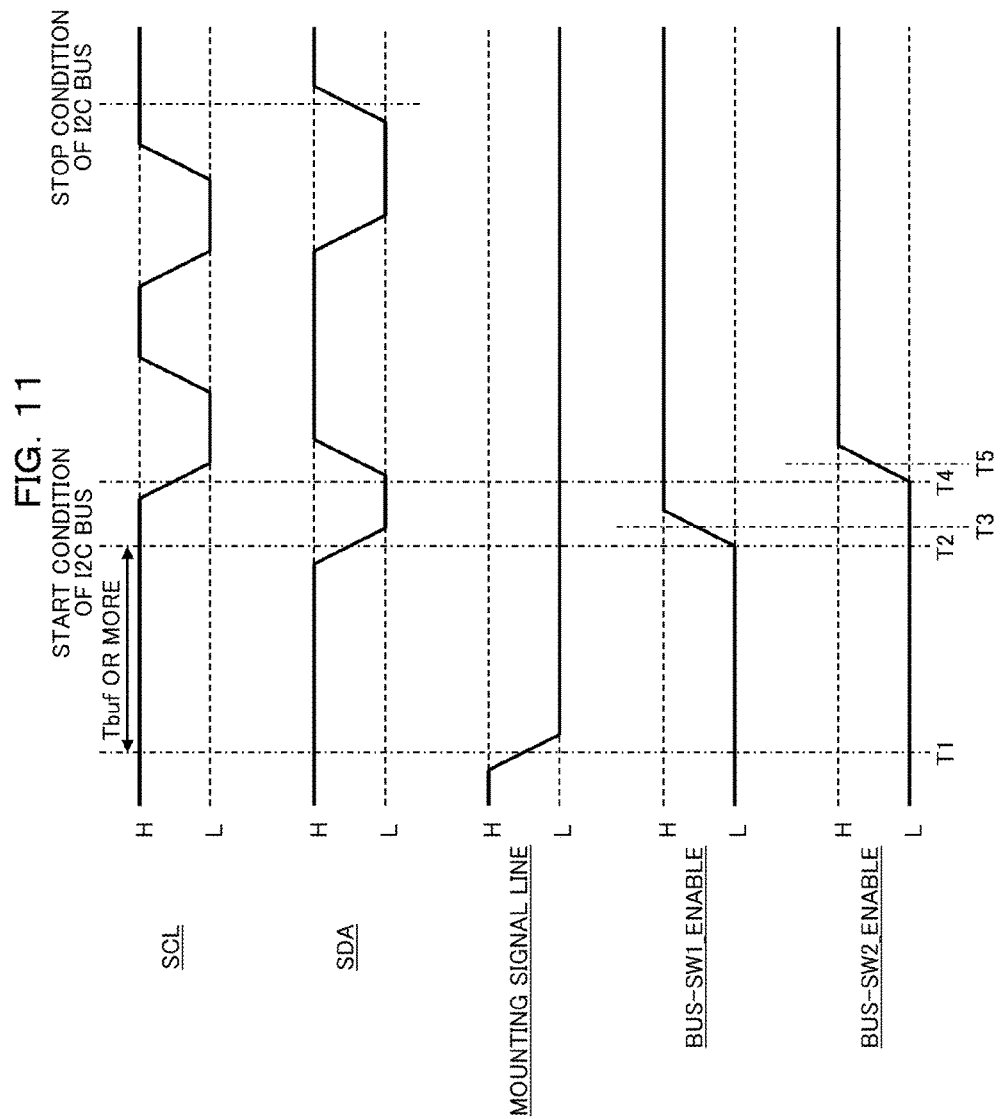
FIG. 11 is a time chart depicting an example of states of the serial bus, amounting signal line and a BUS-SW ENABLE depicted in FIG. 2.

Now, an example of operation of the coupling control of the additional unit 20 (I2C device 21-1) with the serial bus 32 in the I2C controller 50 according to the first embodiment configured in such a manner as described above is described with reference to FIGS. 9 to 11. FIG. 9 is a flow chart illustrating an example of operation of the I2C controller 50 depicted in FIG. 1 and FIG. 10 is a view illustrating an example of operation of the I2C controller 50 depicted in FIG. 1. FIG. 11 is a time chart depicting an example of states of the serial bus 32, mounting signal line 34 and controlling line 33 depicted in FIG. 2. It is to be noted that, in FIG. 9, the control lines 33a and 33b are denoted as "BUS-SW1_ENABLE" and "BUS-SW2_ENABLE", respectively.

First, as depicted in FIG. 9, it is decided by the bus switch controller 10 whether it is detected that a mounting signal arising from that the additional unit 20 is coupled with the connector 7 (step S1). If it is decided that a mounting signal is not detected (No route at step S1), then the decision at step S1 is performed until the mounting signal is detected.

On the other hand, if it is decided that amounting signal is detected (Yes route at step S1; refer to an arrow mark (1) of FIG. 10 and timing T1 of FIG. 11), then it is decided by the bus switch controller 10 whether bus free time (Tbuf) is detected (step S2). In particular, the bus switch controller 10 monitors the voltage levels of the SDA 32a and SCL 32b of the serial bus 32 and performs detection of bus free time (intermediate time period between a bus access and another bus access) within which both of the SDA 32a and SCL 32b are in a High state within a fixed time period (Tbuf). If it is decided by the bus switch controller 10 that a Tbuf is not detected (No route at step S2), then the decision at step S2 is performed until a Tbuf is detected.

On the other hand, if it is decided that a Tbuf is detected (Yes route at step S2; refer to (2) of FIG. 10 and timings T1 and T2 of FIG. 11), then it is decided by the bus switch controller 10 whether it is decided that the voltage level of the SDA 32a transits from High to Low (step S3). In particular, if a bus free time is detected, then the bus switch controller 10 detects generation of the START condition of the I2C bus. If it is decided by the bus switch controller 10 that it is not detected that the voltage level of the SDA 32a transits from High to Low (No route at step S3), then the decision at step S3 is performed repetitively until transition of the voltage level is detected.

On the other hand, if it is decided at step S3 that it is detected that the voltage level of the SDA 32a transits from High to Low (Yes route at step S3; refer to an arrow mark (3) of FIG. 10 and timing T2 of FIG. 11), then the processing advances to step S4.

At step S4, by the bus switch controller 10, the control line 33a is placed into an enable state and the bus switch 4a is closed, and as a result, the SDA 32a and the SDA 41a are coupled with each other (refer to arrow marks (4) and (5) of FIG. 10 and timing T3 of FIG. 11). In particular, the bus switch controller 10 couples the SDA 41a of the I2C device 21-1 with the serial bus 32 in a state in which the SDA 32a is maintained at Low. Since the I2C device 21-1 is coupled with the serial bus 32 in a state in which the SDA 32a drops to Low, the I2C device 21-1 can be coupled while suppressing an influence of noise by capacitor components (stray capacitance) of a terminal of the additional unit 20. Consequently, the I2C device 21-1 can be coupled with the serial bus 32 not from an intermediate portion of a bus cycle of the I2C bus but from the top of the bus cycle.

Then, it is decided by the bus switch controller 10 whether it is detected that the voltage level of the SCL 32b transits from High to Low (step S5). If it is decided that it is not detected that the voltage level of the SCL 32b transits from High to Low (No route at step S5), then the decision at step S5 is performed repetitively until the transition is detected.

On the other hand, if it is decided at step S5 that it is detected that the voltage level of the SCL 32b transits from High to Low (Yes route at step S5; refer to an arrow mark (6) of FIG. 10 and timing T4 of FIG. 11), then the processing advances to step S6.

At step S6, by the bus switch controller 10, the controlling line 33b is placed into an enable state and the bus switch 4b is closed, and as a result, the SCL 32b is coupled with the SCL 41b (refer to arrow marks (7) and (8) of FIG. 10 and timing T5 of FIG. 11). In particular, after the START condition is generated, the bus switch controller 10 couples the SCL 41b of the I2C device 21-1 with the serial bus 32 in a state in which the SCL 32b is maintained Low.

By the processing described above, the coupling control of the additional unit 20 (I2C device 21-1) with the serial bus 32 by the I2C controller 50 is completed.

[1-5] Advantages of the Embodiment

In this manner, with the I2C controller 50 according to the first embodiment, the BUS-SW ENABLE setting unit 14 performs switching control for the switching unit 4 such that a signal line with regard to which it is decided by the signal level decision unit 13 that the intensity (voltage level) of a signal is lower than the given threshold value is coupled with the I2C device 21-1. Accordingly, the bus switch controller 10 can couple the corresponding SDA 41a and SCL 41b of the I2C device 21-1, for example, individually for each of signal lines that drop to Low. Consequently, the I2C controller 50 can suppress an influence of noise by capacitor components of the terminals of the additional unit 20 without stopping the system bus 32. In particular, the signal lines of the I2C device 21-1 can be coupled with the serial bus 32 at a timing at which the magnitude of noise becomes minimum, and the influence on the serial bus 32 upon coupling of the I2C device 21 can be reduced.

Further, the decision described above is performed when it is detected based on the intensity (voltage level) of the signals that a different I2C device 21 coupled with the serial bus 32 does not use the serial bus 32. Accordingly, the bus switch controller 10 can detect that the voltage levels of the SDA 32a and SCL 32b drop to Low when the condition of the I2C bus becomes the START condition. Consequently, the I2C controller 50 can couple the I2C device 21 with the system bus 32 not from an intermediate portion of the bus cycle of the I2C bus but from the top of the bus cycle, and the occurrence probability of malfunction of the I2C device 21-1 can be decreased rather than that upon coupling in an intermediate portion of the bus cycle.

Further, it is decided by the bus switch controller 10 that the different I2C device 21 does not use the serial bus 32 when the intensity (voltage level) of the signals inputted from the SDA 32a and SCL 32b is equal to or higher than the given threshold value within a time period of the time counting for a given time period by the timer unit 12. Accordingly, the bus switch controller 10 can detect the bus free time with a high probability.

Further, since the voltage level drops to Low in order of the SDA 32a and the SCL 32b after the START condition, the bus switch controller 10 can couple the I2C device 21 with the I2C bus in stability with the determined procedure in every time.

Further, when it is detected by the mounting signal detection unit 11 that the I2C device 21-1 is connected to the switching unit 4, the bus switch controller 10 starts detection of a state in which the different I2C device 21 does not use the serial bus 32. Accordingly, the I2C controller 50 can autonomously couple the I2C device 21-1 with the serial bus 32 in response to connection of the additional unit 20 to the connector 7, and the convenience is high.

Further, the switching unit 4 includes the bus switches 4a and 4b that perform the switching control individually of the SDA 32a and the SCL 32b with the SDA 41a and the SCL 41b. Accordingly, the I2C device 21-1 can be connected to the serial bus 32 efficiently in order beginning with a signal line whose voltage level drops to Low.

[2] Second Embodiment

While it is described in the description of the first embodiment above that the information processing apparatus 1 includes the two I2C devices 21-2 and 21-3 and the one additional unit 20 is coupled with the information processing apparatus 1, the present technology is not limited to this. For example, as depicted in FIG. 12, a plurality of (for example, three) additional units 20-1 to 20-3 may be coupled with an information processing apparatus 1'.

An example of a configuration of the information processing apparatus 1' is described below with reference to FIGS. 12 and 13.

Figure 12:
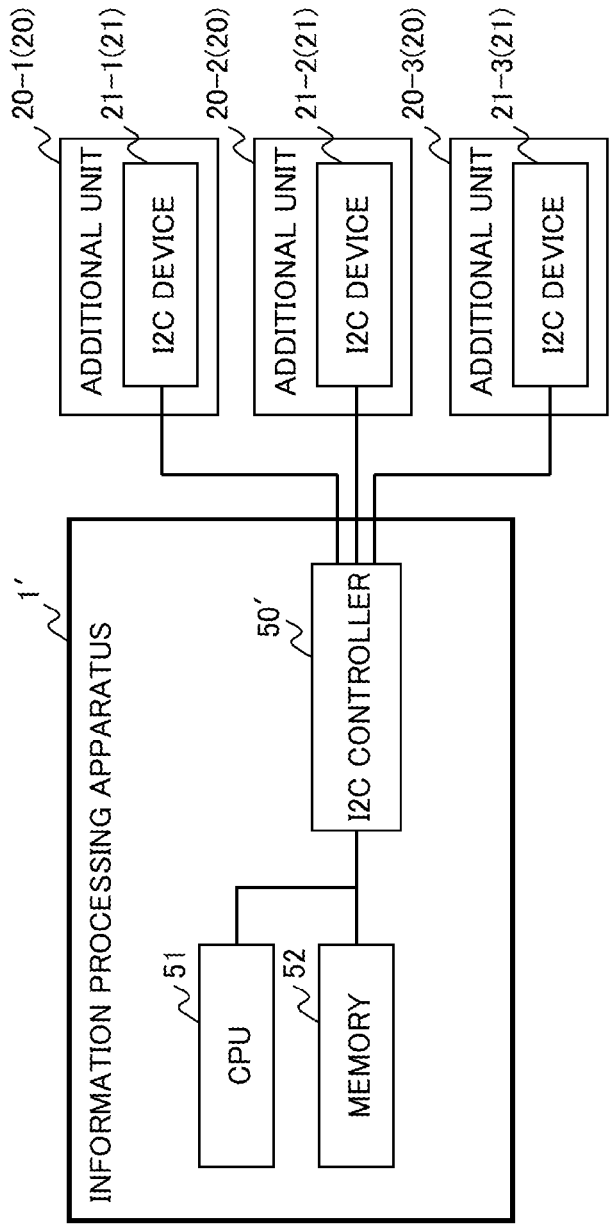
FIG. 12 is a view depicting an example of a configuration of an information processing apparatus according to a second embodiment.
Figure 13:
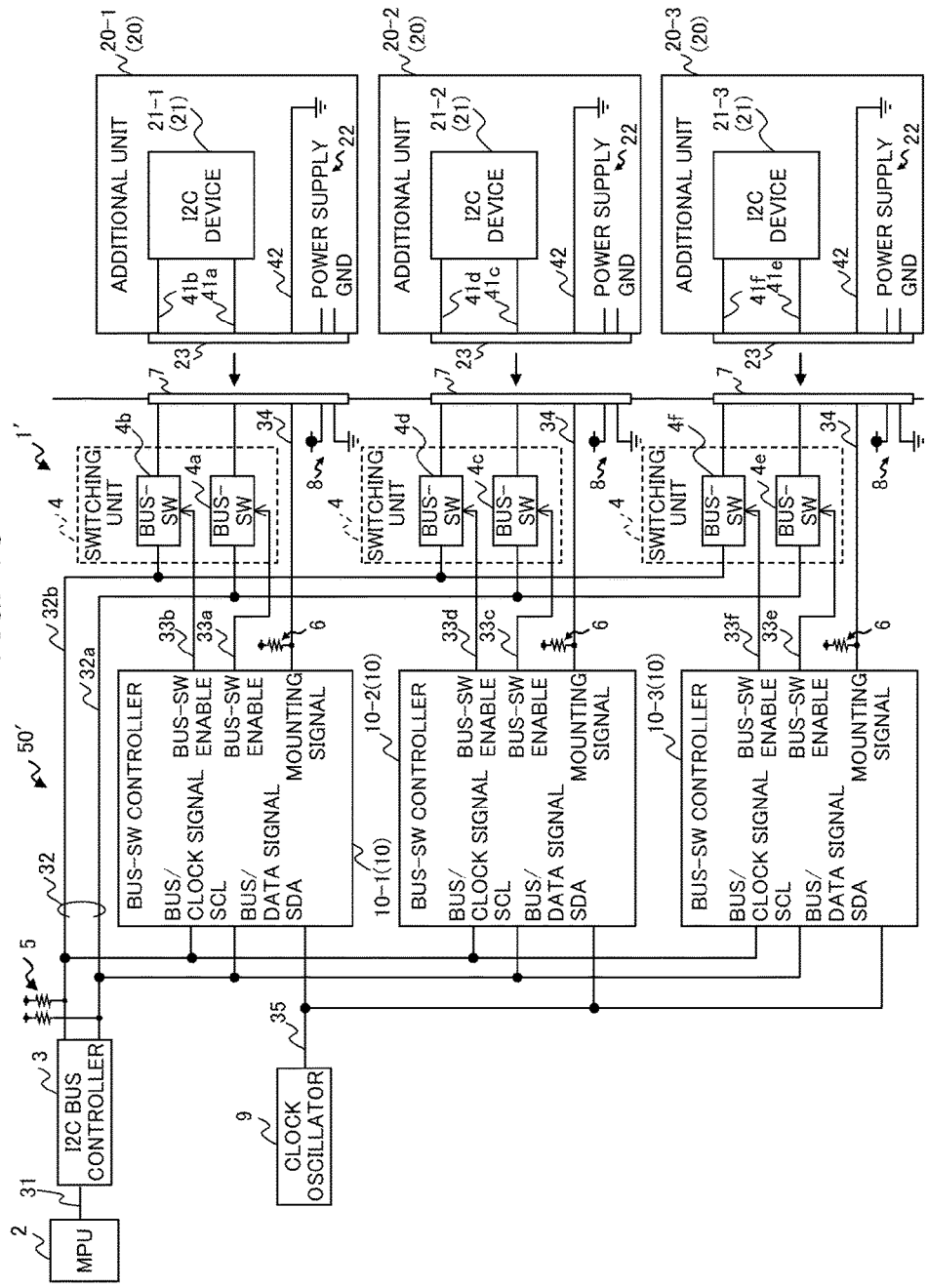
FIG. 13 is a view depicting an example of a configuration of an I2C controller depicted in FIG. 12.
Figure 14:
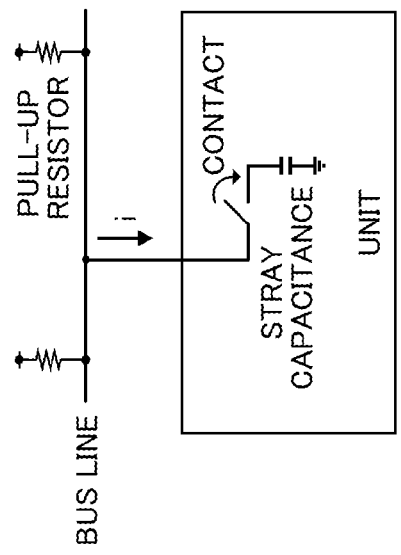
FIG. 14 is a view illustrating an influence on a bus line by a stray capacitance in the inside of a unit when the unit is hot-line connected into the bus line.

FIG. 12 is a view depicting an example of a configuration of the information processing apparatus 1' according to the second embodiment, and FIG. 13 is a view depicting an example of a configuration of an I2C controller 50' depicted in FIG. 12. It is to be noted that, in FIGS. 12 and 13, like elements those in FIGS. 1 and 2 are denoted by like reference characters, and therefore, overlapping description of them is omitted herein.

As depicted in FIG. 12, the information processing apparatus 1' according to the second embodiment includes an I2C controller 50' in place of the I2C controller 50 depicted in FIG. 1. It is to be noted that the information processing apparatus 1' may include an I2C device 21.

The I2C controller 50' performs various controls similar to those of the I2C controller 50 in order to couple the additional units (I2C units) 20-1 to 20-3 including the I2C devices 21-1 to 21-3 with the I2C bus.

As depicted in FIG. 13, the I2C controller 50' according to the second embodiment includes a number of bus switch controllers 10, pull-up resistors 6, switching units 4 and power supplying units 8 equal to that of connectors 7 for coupling the additional units 20-1 to 20-3. On the other hand, the I2C controller 50' includes an MPU 2, an I2C bus controller 3 and a clock oscillator 9 common to the plurality of connectors 7.

The I2C controller 50' according to the second embodiment performs various controls described in connection with the first embodiment individually for the plurality of coupled additional units 20-1 to 20-3.

Consequently, also with the information processing apparatus 1' (I2C controller 50') according to the second embodiment, effects similar to those of the first embodiment can be achieved.

[3] Others

While the preferred embodiments of the present technology have been described in detail above, the present technology is not limited to the embodiments specifically described above, and various variations and modifications can be made without departing from the scope of the present technology.

For example, while, in the first and second embodiments described above, it is described that, if GND coupling of the mounting signal line 34 is detected, then the mounting signal detection unit 11 detects that the additional unit 20 is mounted (connected), the present technology is not limited to this. The detection of mounting of the additional unit 20 by the mounting signal detection unit 11 can be performed by various known techniques, and detailed description of the techniques is omitted herein.

Further, while, in the first and second embodiments described above, it is described that the serial bus 32 is an I2C bus, the present technology is not limited to this. As the serial bus 32, some other two-line type serial bus may be used and a serial bus including a plurality of signal lines other than a two-line type serial bus may be used. Whichever one of the serial buses is applied as the serial bus 32, the bus switch controller 10 may control the switching unit 4 to perform the switching control individually for signal lines with regard to which the intensity (voltage level) of a signal is equal to or lower than the given threshold value. It is to be noted that the bus switch controller 10 may suitably modify a detection technique for the bus free time in accordance with the standard for some other two-line type serial bus or a serial bus including a plurality of signal lines.

Further, while, in the first and second embodiments described above, it is described that the signal level decision unit 13 detects that the voltage level of each signal is switched to Low after the Tbuf is detected, the present technology is not limited to this. For example, when it is detected that the voltage level is switched to Low even in the middle of a bus cycle, the signal level decision unit 13 may perform the coupling control of the bus switch 4a or 4b with the SDA 32a or the SCL 32b placed in Low. Consequently, the I2C controller 50 can couple the additional unit 20 (I2C device 21) with the serial bus 32 at an earlier timing than the detection of the Tbuf is waited.

Further, while, in the first and second embodiments described above, it is described that one or three additional units 20 are coupled with the information processing apparatus 1 or 1', the number of additional units 20 is not limited to them and can be increased or decreased suitably.

It is to be noted that the processes at steps S1 to S6 depicted in FIG. 9 may be performed where there is the different I2C device 21 coupled with the serial bus 32. However, where there is no different I2C device 21, at least the processes (in random order) at steps S4 and S6 may be performed.

With the first and second embodiments, an influence to be had on a bus upon coupling of a device can be reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A coupling controller that performs coupling control of a device with a bus, comprising:
    a decision circuit configured to decide whether a voltage level of a signal inputted from each of a plurality of signal lines included in the bus is lower than a given threshold value; and
    a switching controller configured to perform, for each of the plurality of signal lines, switching control on a switching unit, the switching unit being interposed between the bus and the device and switching coupling between each of the plurality of signal lines and the device, such that a signal line with regard to which it is decided by the decision circuit that a voltage level of the signal is lower than the given threshold value is coupled with the device, wherein
    when a state in which the bus is not used by any other device coupled with the bus is detected based on the voltage levels of the signals, the decision circuit performs decision of whether the voltage level of the signal is lower than the given threshold value for each signal line;
    the bus is a two-line type serial bus; and
    after it is decided that the bus is not used by any other device, the decision circuit performs decision of whether the signal level of each of the signals inputted from the signals line is lower than the given threshold value in order of a data signal line and a clock signal line from among the plurality of signal lines in response to a timing of use starting of the bus by any other device.

2. The coupling controller according to claim 1, further comprising a timer configured to perform time counting of a given period; wherein
    the decision circuit decides that the bus is not used by any other device when all of the voltage levels of the signals inputted from the plurality of signal lines are equal to or higher than the given threshold value within a period within which the time counting of the given period by the timer is performed.

3. The coupling controller according to claim 1, further comprising a detection circuit configured to detect that the device is connected to the switching unit; wherein
    when it is detected by the detection circuit that the device is coupled with the switching unit, the decision circuit starts detection of a state in which the bus is not used by any other device.

4. The coupling controller according to claim 1, wherein the switching unit includes a plurality of switches configured to switch coupling with the device for each of the plurality of signal lines; and
    the switching controller performs the switching control for the switch corresponding to the signal line detected by the decision circuit.

5. The coupling controller according to claim 1, wherein at least one of the decision circuit and the switching controller includes one or more logic circuits.

6. An information processing apparatus, comprising:
    a decision circuit configured to decide whether a voltage level of a signal inputted from each of a plurality of signal lines included in a bus is lower than a given threshold value;

a switching unit interposed between the bus and a device coupled with the bus and configured to switch coupling between each of the plurality of signal lines and the device; and a switching controller configured to perform, for each of the plurality of signal lines, switching control on the switching unit such that a signal line with regard to which it is decided that a voltage level of the signal is lower than the given threshold value is coupled with the device, wherein when a state in which the bus is not used by any other device coupled with the bus is detected based on the voltage levels of the signals, the decision circuit performs decision whether the voltage level of the signal is lower than the given threshold value for each signal line;

the bus is a two-line type serial bus; and after it is decided that the bus is not used by any other device, the decision circuit performs decision of whether the signal level of each of the signals inputted from the signals line are lower than the given threshold value in order from a data signal line and a clock signal line from among the plurality of signal lines in response to a timing of use starting of the bus by the different device.

7. The information processing apparatus according to claim 6, further comprising a timer configured to perform time counting of a given period; wherein the decision circuit decides that the bus is not used by any other device when all of the voltage levels of the signals inputted from the plurality of signal lines are equal to or higher than the given threshold value within a period within which the time counting of the given period by the timer is performed.

8. The information processing apparatus according to claim 6, further comprising a detection circuit configured to detect that the device is connected to the switching unit; wherein when it is detected by the detection circuit that the device is coupled with the switching unit, the decision circuit starts detection of a state in which the bus is not used by any other device.

9. The information processing apparatus according to claim 6, wherein the switching unit includes a plurality of switches configured to switch coupling with the device for each of the plurality of signal lines; and the switching controller performs the switching control for the switch corresponding to the signal line detected by the decision circuit.

10. The information processing apparatus according to claim 6, wherein at least one of the decision circuit and the switching controller includes one or more logic circuits.

11. A coupling control method for a coupling controller that performs coupling control of a device with a bus, comprising:

deciding whether a voltage level of a signal inputted from each of a plurality of signal lines included in the bus is lower than a given threshold value; and performing, for each of the plurality of signal lines, switching control on a switching unit, the switching unit being interposed between the bus and the device and switching coupling between each of the plurality of signal lines and the device, such that a signal line with regard to which it is decided that a voltage level of the signal is lower than the given threshold value is coupled with the device, wherein the deciding performs, when a state in which the bus is not used by any other device coupled with the bus is detected based on the voltage levels of the signals, decision whether the voltage level of the signal is lower than the given threshold value for each signal line;

the bus is a two-line type serial bus; and the deciding performs, after it is decided that the bus is not used by any other device, decision of whether the signal level of each of the signals inputted from the signals line is lower than the given threshold value is performed in order from a data signal line and a clock signal line from among the plurality of signal lines in response to a timing of use starting of the bus by the different device.

12. The coupling control method according to claim 11, wherein the deciding performs, it is decided that the bus is not used by the different device when all of the voltage levels of the signals inputted from the plurality of signal lines are equal to or higher than the given threshold value within a period of time timing counting of the given period is performed.

13. The coupling controlling method according to claim 11, further comprising detecting that the device is connected to the switching unit; wherein the deciding starts, when it is detected that the device is coupled with the switching unit, detection of a state in which the bus is not used by any other device.

14. The coupling controlling method according to claim 11, wherein the switching unit includes a plurality of switches configured to switch coupling with the device for each of the plurality of signal lines; and the switching control is performed for the switch corresponding to the signal line detected at the deciding.

* * * * *